(12) United States Patent
Igarashi

(10) Patent No.: US 6,188,362 B1
(45) Date of Patent: Feb. 13, 2001

(54) PORTABLE RECEIVER

(75) Inventor: Hideo Igarashi, Tokyo (JP)

(73) Assignee: Sony Corporation, Tokyo (JP)

( * ) Notice: Under 35 U.S.C. 154(b), the term of this patent shall be extended for 0 days.

(21) Appl. No.: 09/147,220

(22) PCT Filed: Mar. 3, 1998

(86) PCT No.: PCT/JP98/00873

§ 371 Date: Mar. 12, 1999

§ 102(e) Date: Mar. 12, 1999

(87) PCT Pub. No.: WO98/39815

PCT Pub. Date: Sep. 11, 1998

(30) Foreign Application Priority Data

Mar. 3, 1997 (JP) .................................................. 9-048054

(51) Int. Cl.[7] .................................................. H01Q 1/24
(52) U.S. Cl. .................................................. 343/702; 343/718
(58) Field of Search ................... 343/718, 702, 343/787, 906

(56) References Cited

U.S. PATENT DOCUMENTS 5,128,686 * 7/1992 Tan et al. ............................ 343/718
5,757,332 * 5/1998 Hanaoka et al. .................... 343/787

FOREIGN PATENT DOCUMENTS

59/9650 * 1/1984 (JP) .

* cited by examiner

*Primary Examiner*—Don Wong
*Assistant Examiner*—Ephrem Alemu
(74) *Attorney, Agent, or Firm*—Jay H. Maioli

(57) ABSTRACT

A portable type receiving apparatus with a strap antenna (106) has a case (100) on the lateral side of which at least one through hole for inserting the strap antenna (106) along its circumference is provided. Further, the strap antenna (106) has a portion exposed outside the case (100) in the form of a loop via the through hole, and a received signal processing circuit for processing a received signal from the strap antenna (106) as well as a connector (105) for connecting the strap antenna (106) to the received signal processing circuit. Moreover, a strap antenna length adjusting device (109) for adjusting a length of the exposed portion of the strap antenna (106) is provided. This enables the loop length of strap antenna (106) to be adjusted by a simple structure and operation.

14 Claims, 12 Drawing Sheets

PORTABLE RECEIVER

BACKGROUND OF THE INVENTION

1. Technical Field

The present invention relates to a portable type receiving apparatus provided with a strap antenna in the form of a hanging strap, and particularly to an apparatus which is effectively applied to a palm top portable type television receiver.

2. Background Art

As a portable television (TV) receiving set which is formed into a palm top type and has a strap antenna, those having such an appearance as shown in FIGS. 16A and 16B have heretofore been provided.

This TV receiving set has a set case 10 which is formed in such a size as can be gripped by the palm of a human hand. As shown in FIG. 16A, a TV screen 12 made of a liquid crystal device (LCD) and a speaker unit 14 are arranged in the front of the set case 10. As shown in FIG. 16B, a connecting fastener 18 which fastens both ends of a strap antenna 16 is provided in the back lower part of the set case 10.

Specifically, the strap antenna 16 is connected to an internal circuit through the connecting fastener 18 fastening its both ends and, as a whole, hangs down beneath the set case 10 in the form of a closed loop.

Unfortunately, because the strap antenna 16 is provided hanging down beneath the set case 10 in the above conventional TV receiving set, when a user tries to hang the TV receiving set somewhere using the strap antenna 16 and view the TV, the TV screen 12 will be turned upside down.

Moreover, the strap antenna 16 has a fixed loop length and so, even if a user tries to use it as a neck or shoulder hanging strap when carrying the same, it can not cope with the physical difference among individuals, which has raised a problem. Furthermore, because the strap antenna has an exposed portion of a given length to the case, it has been also difficult for a user to cope with the receiving sensitivity.

BRIEF SUMMARY OF THE INVENTION

The present invention provides a portable type receiving apparatus which has a strap antenna whose loop length can be adjusted by a simple structure and operation.

The present invention provides a portable type receiving apparatus with a strap antenna characterized by comprising a case, at least one through hole provided in the case, a strap antenna having a portion exposed outside the case in the form of a loop via the through hole, a received signal processing means for processing a received signal from the strap antenna, a connecting means for connecting the strap antenna to the receiving signal processing means, and a strap antenna length adjusting means for adjusting a length of the exposed portion. Further, the term "in the form of a loop" in the present invention means a state in which a mid-portion of the strap antenna is exposed from the through hole of the case.

Moreover in the above portable type receiving apparatus according to the present invention, there is provided an end portion fastening means for fastening a first end portion of the strap antenna within the case, the strap antenna length adjusting means being a holding means which slidably holds a middle portion beyond the exposed portion from the first end portion of the strap antenna and is arranged to adjust the length of the exposed portion by sliding the middle portion.

Furthermore, in the above portable type receiving apparatus according to the present invention, the through hole is comprised of two through holes.

In addition, in the above portable type receiving apparatus according to the present invention, the through hole is provided in a first end face side of the case and the case is formed to have a standing leg part for using the portable type receiving apparatus in a self-stand state in a second end face side opposite to the first end face side.

Also, in the above portable type receiving apparatus according to the present invention, the case is formed to have a liquid crystal display (LCD) and a speaker which are connected to the received signal processing means, and the portable type receiving apparatus is made into a television receiving set.

Again, in the above portable type receiving apparatus according to the present invention, the case is arranged to have an operating button for operating the holding means and by operating the operating button the middle portion of the strap antenna is slidably held.

Moreover, in the above portable type receiving apparatus according to the present invention, the holding means includes a pressing means for pressing the middle portion of the strap antenna to a wall part side of the case, an urging means for urging the pressing means to the wall part, and a moving means for moving the pressing means in such a direction that it leaves the wall part side against an urging force from the urging means in response to an operation of the operating button.

The present invention provides the portable type receiving apparatus with the strap antenna characterized by comprising a case, at least one first through hole and at least one second through hole provided in the case, a strap antenna having a first portion exposed outside the case in the form of a loop via the first through hole and a second portion exposed outside the case in the form of a loop via the second through hole, a received signal processing means for processing the received signal from the strap antenna, a connecting means for connecting the strap antenna to the received signal processing means, and a strap antenna length adjusting means for adjusting each length of the first portion and the second portion.

Moreover, in the above portable type receiving apparatus according to the present invention, there are provided a first end portion fastening means for fastening a first end portion of the strap antenna within the case, and a second end portion fastening means for fastening a second end portion of the strap antenna within the case, the strap antenna length adjusting means being a holding means which slidably holds a middle portion of the strap antenna within the case and is arranged to adjust each length of the first exposed portion and the second exposed portion by sliding the middle portion.

Furthermore, in the above portable type receiving apparatus according to the present invention, the first through hole and the second through hole are comprised of two through holes, respectively.

In addition, in the above portable type receiving apparatus according to the present invention, the first through hole is provided in a first end face side of the case, and the second through hole is provided in a second end face side of the case opposite to the first end face side.

Also, in the above portable type receiving apparatus according to the present invention, the case is formed to have a standing leg part for using the portable type receiving apparatus in a self-stand state in the first end face side or the second end face side.

Again, in the above portable type receiving apparatus according to the present invention, the case is formed to have a strap antenna escaping part for making the first exposed portion or the second exposed portion of the strap antenna in the form of a loop to escape in the first end face side or the second end face side.

Moreover, in the above portable type receiving apparatus according to the present invention, the case is formed to have a liquid crystal display (LCD) and a speaker which are connected to the received signal processing means, and the portable type receiving apparatus is made into a television receiving set.

Furthermore, in the above portable type receiving apparatus according to the present invention, the case is arranged to have an operating button for operating the holding means and by an operation of the operating button the middle portion of the strap antenna is slidably held.

In addition, in the above portable type receiving apparatus according to the present invention, the holding means includes a pressing means for pressing the middle portion of the strap antenna to a wall part side of the case and a moving means for moving the pressing means in such a direction that it leaves the wall part side against an urging force from the urging means in response to an operation of the operating button.

According to the above described present invention, because the loop length of the portion exposed outside the case of the strap antenna can be adjusted by the strap antenna length adjusting means, by making longer the loop length of the strap antenna, for example, in the upward direction of the case and using this as a hanging strap, it will be possible to view the display screen in a state where the case is hung somewhere.

Moreover, by adjusting the loop length of the strap antenna, it will be possible to adjust the length to fit an individual physique as a neck hanging strap or a shoulder hanging strap. Furthermore, by adjusting the loop length of the strap antenna, it will also be possible to adjust the receiving sensitivity.

In addition, by providing the standing leg part, it will be possible to use the portable type receiving apparatus in the self-stand state. Further, because the strap antenna escaping part is provided near the standing leg part, even if the strap antenna exists, the loop becomes no obstacle and thus the portable type receiving apparatus can be used in the standing state.

BRIEF DESCRIPTION OF DRAWINGS

FIGS. 11A, 11B, and 11C are a set of diagrams showing modes of a standing bottom part of the TV receiving set shown in FIG. 1, in which FIG. 11A shows a case where a groove is formed in a lateral straight line, FIG. 11B shows a case where grooves are formed near the through holes, and FIG. C shows a case where a T-shaped groove is formed.

FIGS. 14A and 14B are a partially omitted perspective views showing a holding mechanism of the strap antenna provided in the TV receiving set shown in FIG. 1, in which FIG. 14A shows a state of holding and FIG. 14B shows a state where the holding is a set of released.

FIGS. 16A and 16B are a set of diagrams showing an example of the conventional TV receiving set, in which FIG. 16A is a front view and FIG. 16B is a rear view.

DETAILED DESCRIPTION OF THE INVENTION

Figure 1:
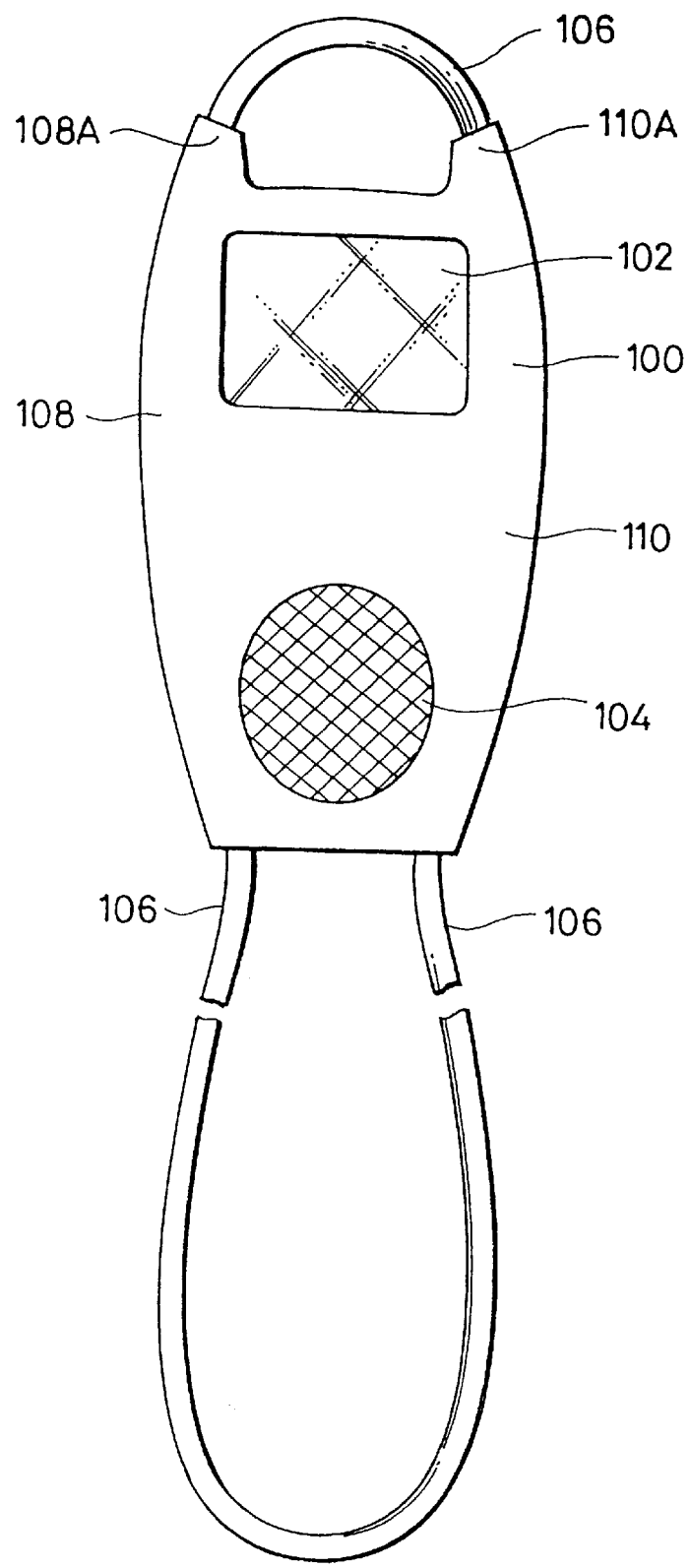
FIG. 1 is a front view showing an appearance of a portable type TV receiving set as an embodiment of the portable type receiving apparatus according to the present invention.

The TV receiving set according to the present embodiment is driven by a built-in battery and has, as shown in FIG. 1, a set case 100 formed in such a size as can be gripped by the palm of a human hand as the case. Specifically, the set case 100 has such a front shape that both of top and bottom end portions of a vertically elongated nearly ellipsoid are cut flatly and it is formed into a round shape as a whole for providing a good feeling when gripped.

Further, a TV screen 102 made of a liquid crystal display (LCD) is provided in an upper part on the surface of set case 100 and a speaker 104 is provided in a lower part thereon.

Figure 4:
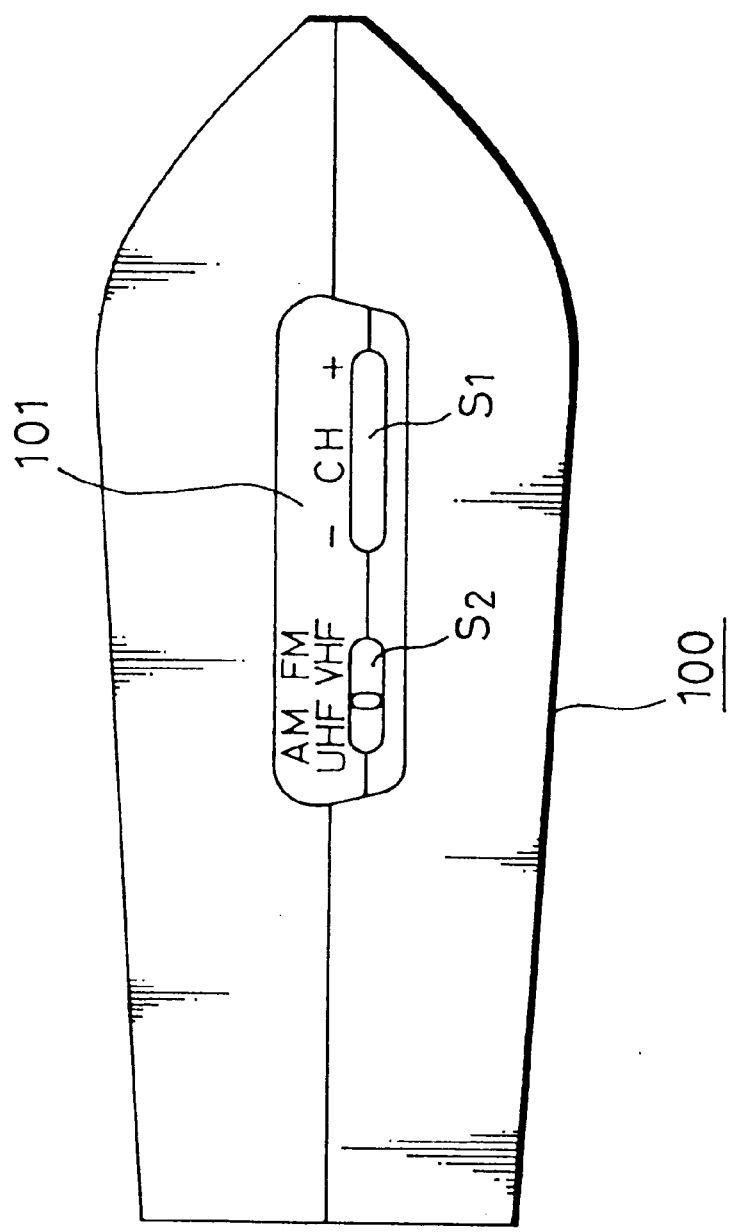
FIG. 4 is a side view of the TV receiving set shown in FIG. 1.

On a side face of the set case 100 there is provided a switching unit 101 having switches such as a switch S1 for changing the channel of the TV receiving set and a switch S2 for switching UHF/VHF or AM/FM of a radio receiver and the like as shown in FIG. 4, for example.

Moreover, on each of a top face side and a bottom face side opposed to each other of the set case 100 there are provided inserting parts 108 and 110 each having a through hole (not shown) for inserting a strap antenna 106.

Figure 3:
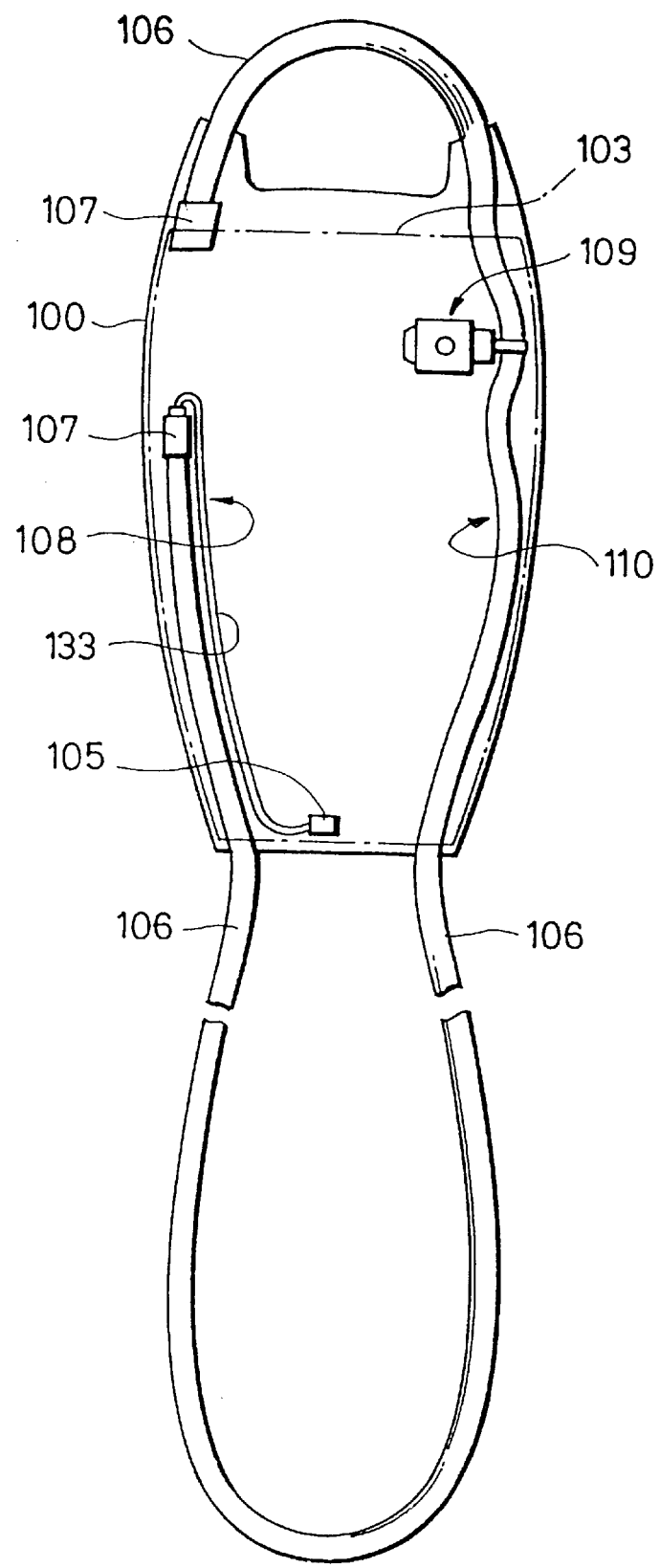
FIG. 3 is a diagram showing an internal structure of the TV receiving set shown in FIG. 1.

One inserting part 108 forms a connecting fastener which fastens both end portions of the strap antenna 106 to connect the same to an internal circuit. Specifically, the both end portions of the strap antenna 106 are inserted into the inserting part 108 from respective through holes on the top face and the bottom face of the inserting part 108, and are each fastened by a fastening member of an end portion fastening means 107 as shown in FIG. 3, thereby causing the entire strap antenna 106 to be formed into a C-shaped loop. The strap antenna 106 whose both end portions are fastened to form the C-shaped loop has a portion exposed outside the set case 100 in the form of a loop via two through holes of the top face side and another portion exposed outside the set case 100 in the form of a loop via two through holes of the bottom face side.

Furthermore, a conductor (what is called an antenna) 133 (see FIG. 7) derived and extended from one of the end portions (a lower portion in FIG. 3) of strap antenna 106 fastened by the end portion fastening means 107 is connected through a circuit connector 105 to a circuit board 103 which is provided inside the set case 100 and has a circuit as the received signal processing means for processing a received signal from the strap antenna 106 such as a receiving circuit of a TV signal.

In the other inserting part 110 there is provided a strap antenna length adjusting means 109 for adjusting the loop length of the strap antenna 106. This strap antenna length adjusting means 109 forms the holding means for slidably holding the middle portion of the strap antenna 106.

In addition, the inserting parts 108 and 110 at the top end of the set case 100 are further extended upwards to form guide parts 108A and 110A for guiding the strap antenna 106.

By such two inserting parts 108 and 110, the two exposed loops made of the single strap antenna 106 will be formed at both of top and bottom outsides of the set case 100.

Thus, by making the strap antenna 106 to slide along the other inserting part 110, it will be possible to adjust the upper loop length and the lower loop length.

Figure 2:
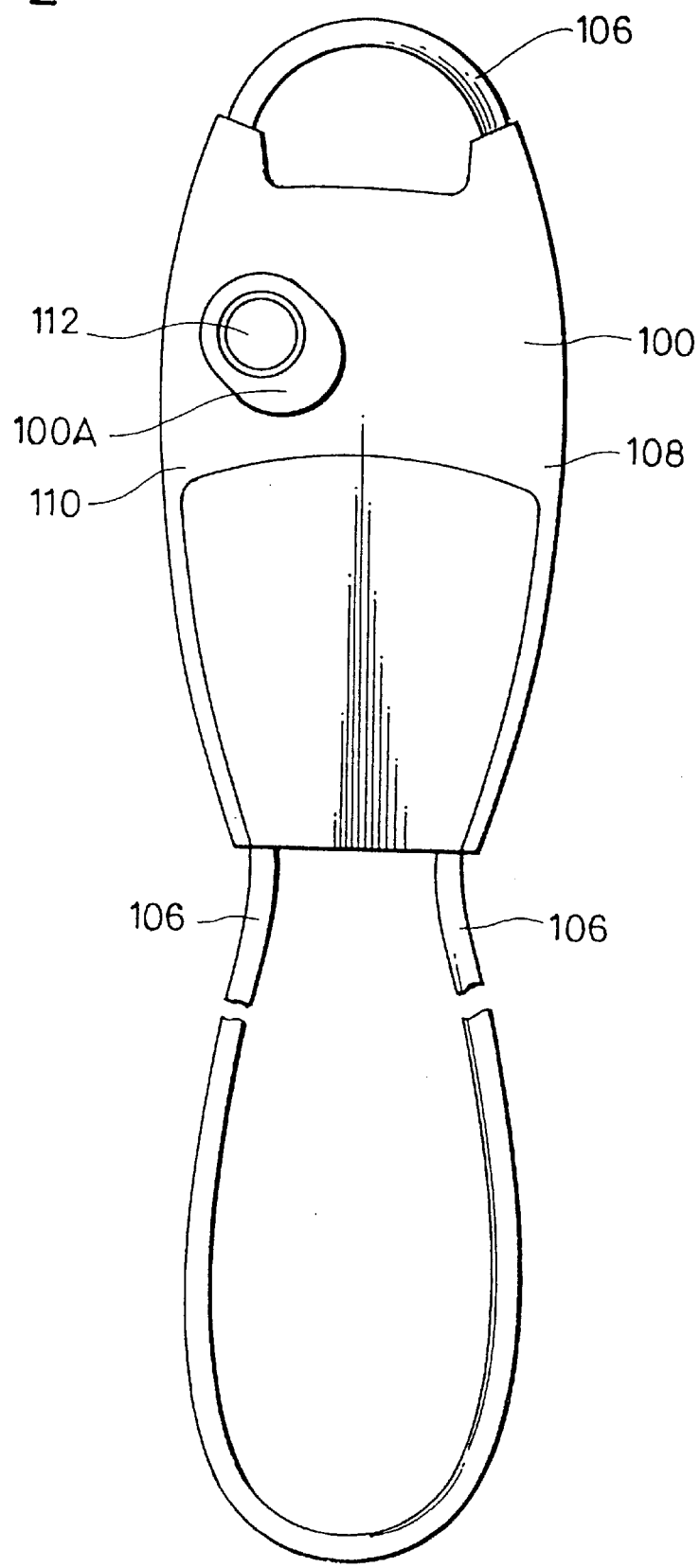
FIG. 2 is a rear view of the TV receiving set shown in FIG. 1.
Figure 5:
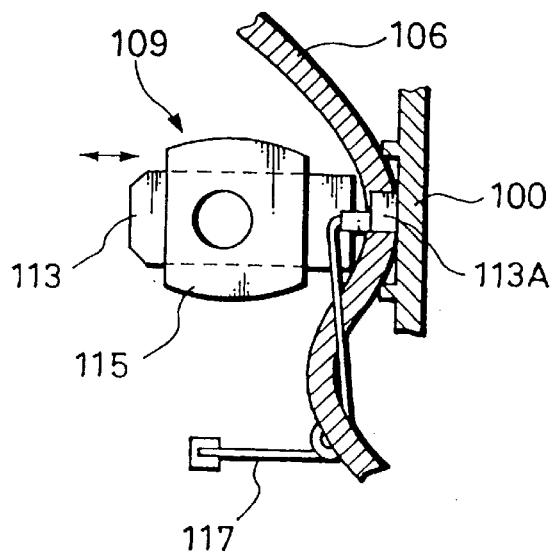
FIG. 5 is a plan view showing a schematic structure of the strap antenna length adjusting means for adjusting the loop length of strap antenna provided in the same TV receiving set.

Such sliding of the strap antenna 106 is normally held by a mechanism made of the strap antenna length adjusting means 109 shown in FIG. 5 and the holding is released by operating a hold button 112 provided in the rear face of the set case 100. Further, 100A in FIG. 2 denotes a recess provided in the rear face of the set case 100 for making the hold button 112 to be pressed easily.

This mechanism will now be described below.

Figure 6:
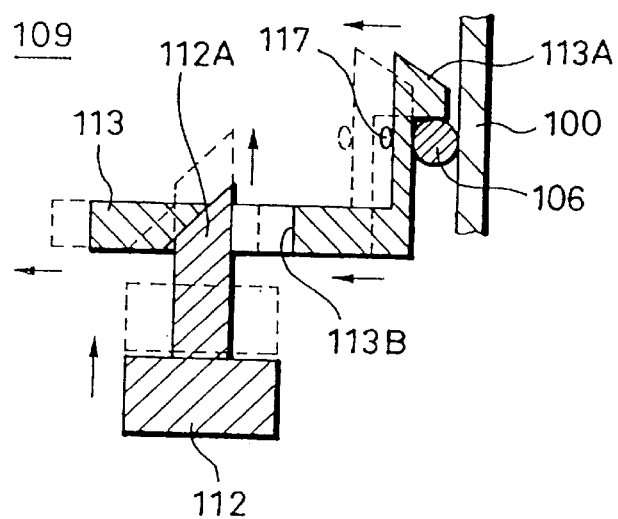
FIG. 6 is a diagram explaining an operation of the strap antenna length adjusting means.

The strap antenna length adjusting means 109 according to the present embodiment is arranged near the inserting part 100 and, as shown in FIG. 5, has a slider 113 for slidably holding the middle portion of the strap antenna 106. A holding portion 113A at the tip of the slider 113 forms a pressing means for pressing the middle portion of the strap antenna 106 to the wall part side of the set case 100. A torsion spring 117 as an urging means for urging the holding portion 113A to the wall part side of the set case 100 and the hold button 112 forming the moving means for moving the holding portion 113A of the slider 113 in such a direction that it leaves the wall part against an urging force (elastic force) of the torsion spring 117 on its pressing operation as shown in FIG. 6 are provided.

Moreover, the hold button 112 has a button tip portion 112A which button tip end portion 112 A has a shape like a cylinder cut aslant. In the slider 113 there is provided a through hole 113B through which the button tip portion 112A can pass and one wall face of which is formed in parallel to a slant face of the button tip portion 112A.

An operation of the strap antenna length adjusting means 109 will be described using FIG. 6.

On pressing to operate the hold button 112, as the hold button 112 moves, a slant face of the through hole 113B in the slider 113 moves to the left in the figure along the slant face of the button tip portion 112A. This makes the whole slider 113 move left and so the holding portion 113A which has been holding the middle portion of the strap antenna 106 leaves the wall part side of the set case 100 against the urging force of the torsion spring 117.

Therefore, because the holding for the middle portion of the strap antenna 106 is loosened in a state that the hold button 112 is pressed for operation, it will be possible to adjust lengths of the portions exposed outside the set case 100, i.e. two lengths of the top and bottom loops by moving the strap antenna 106 within the inserting part 110.

Furthermore, when the pressing operation of the hold button 112 is stopped, the middle portion of the strap antenna 106 is again held by the holding portion 113A of the slider 113. This makes the loop length of the strap antenna 106 to be fixed and so it will be possible to use the loop of strap antenna 106 as a hanging strap and the like.

Figure 7:
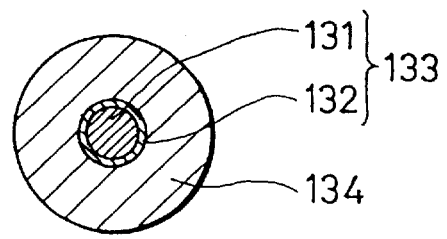
FIG. 7 is a sectional diagram of the strap antenna.

In this case, the strap antenna 106 is made, as its section is shown in FIG. 7, in such a manner that an insulating material 132 such as a resin or the like is wound around a copper wire 131, e.g. twisted into one wire forming the antenna line and a thus formed conductor 133 is further wound with a fiber 134. The winding of fiber 134 ensures a sufficient strength and an insulating property as compared with a case where the strap antenna 106 is made of the conductor 133 only.

Figure 8:
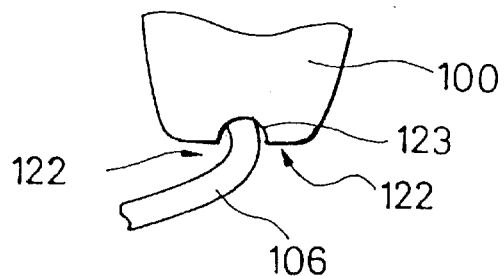
FIG. 8 is a diagram showing a lower end part of the TV receiving set shown in FIG. 1.

In addition, as shown in FIG. 8, on the lower end face side of the set case 100 there is formed a standing leg part 122 in which a groove 123 as the loop escaping part for making the loop of bottom side of the strap antenna 106 to escape is formed. Such structure enables the bottom side loop of the strap antenna 106 to escape to the loop escaping part and the TV receiving set to be placed in the standing state by the standing leg part 122 when the TV receiving set is in the state of self-stand.

Figure 9:
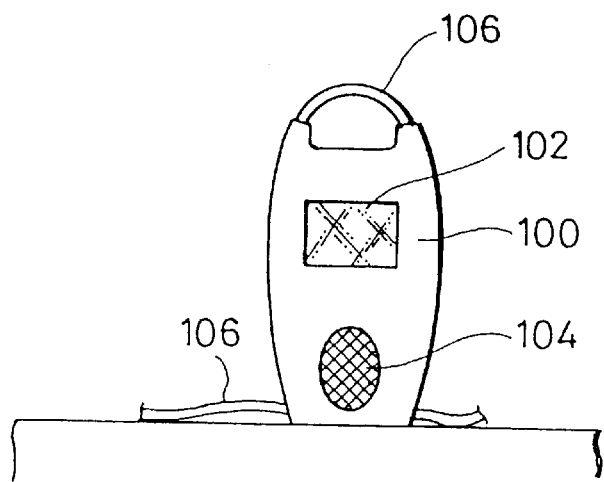
FIG. 9 is a front view showing one mode of use of the TV receiving set shown in FIG. 1.

FIG. 9 shows a case where the thus formed TV receiving set is used in the self-stand state. In this case, the top side loop of the strap antenna 106 is made short and the long bottom side loop thereof is guided laterally through the aforesaid groove 123, whereby the TV receiving set is placed in the standing state by the standing leg part 122.

Figure 10:
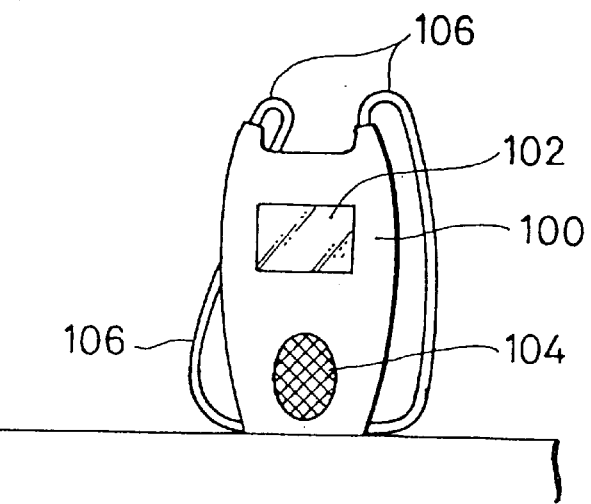
FIG. 10 is a front view showing another mode of use of the TV receiving set shown in FIG. 1.

In contrast, FIG. 10 shows another case where it is used in the self-stand state. In this case, the top side loop of the strap antenna 106 is made long, whereas the bottom side loop thereof is made short. On this occasion, the bottom side loop may be protruded laterally from the groove 123 in the same way as shown in FIG. 9, but in FIG. 10 the bottom side loop is hidden in the set case 100.

Figure 11A:
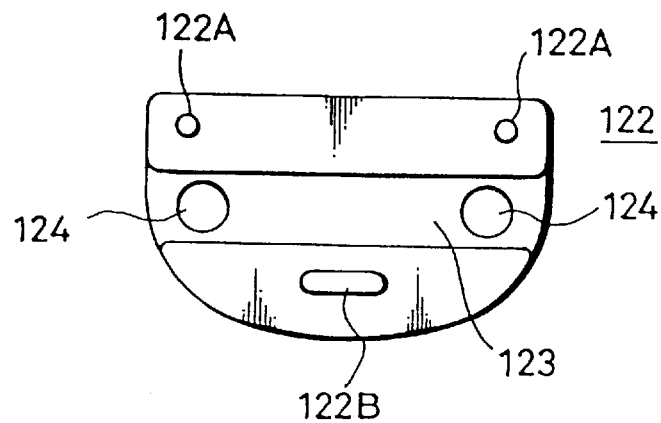
Figure 11B:
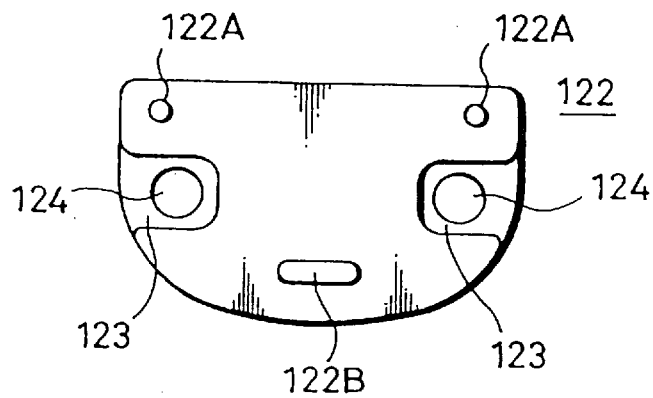
Figure 11C:
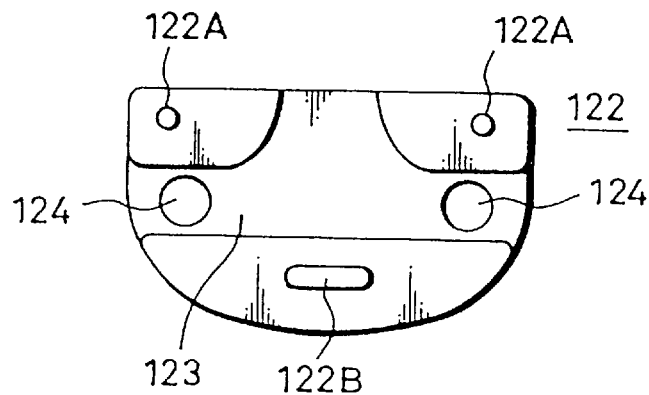

FIGS. 11A, 11B, 11C structures of the standing leg part 122 at the bottom for that purpose.

As shown in FIG. 11A, a straight line groove is formed across the standing leg part 122. This allows the TV receiving set to be placed in the standing state by receiving in the groove 123 the bottom side loop of the strap antenna 106 protruding via through holes 124. Moreover, two projections 122A in a plane circular shape and a projection 122B in a plane track shape are provided on the bottom surface. Thus, a three-point support by these three projections 122A and 122B enables the TV receiving set to be stably placed in the standing state that the bottom side loop of the strap antenna 106 is received in the groove 123 or in the state that it protrudes laterally from the groove.

FIG. 11B shows another modification of the standing leg part 122, in which grooves 123 are formed only around the through holes 124, thus causing the bottom side loop of the strap antenna 106 to protrude laterally of the set case 100 from the grooves 123.

FIG. 11C shows yet another modification of the standing leg part 122, in which the groove 123 is formed in T-shape which has a part of the cross straight line in FIG. 11A and another part for making the strap antenna 106 to protrude forward or backward of the set case 100. A cross point of lateral and longitudinal lines of the T-shaped groove 123 is made wide so as to easily receive the strap antenna 106 which is bent.

Such modifications of the standing leg part 122 as shown in FIG. 11B and FIG. 11C also allow the TV receiving set to be placed in the standing state as well.

Figure 12:
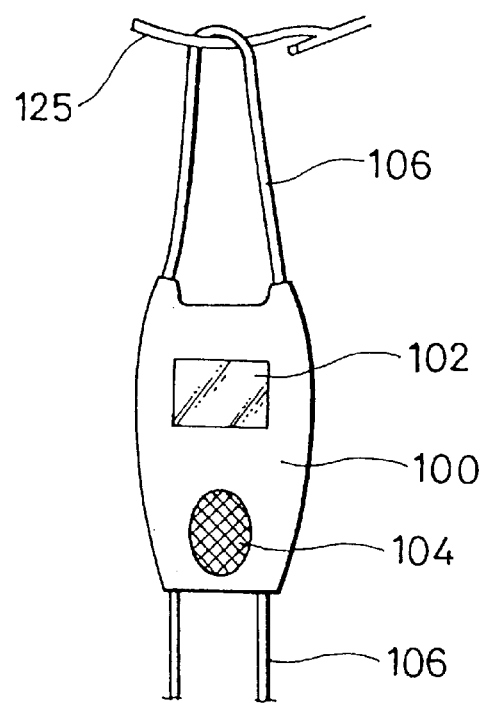
FIG. 12 is a front view showing yet another mode of use of the TV receiving set shown in FIG. 1.

Again, FIG. 12 shows the case where the TV receiving set is used in a hanging state. In this case, the top side loop of the strap antenna 106 is made slightly longer and then hung on a branch 125 of a tree and the like for use. On this occasion, the loop length of strap antenna 106 may be adjusted depending on the receiving sensitivity.

Also, by making longer of the top or bottom loop of the strap antenna 106, it can be used for the embodiment of TV receiving set as a neck hanging strap or a shoulder hanging strap.

In addition, having described the embodiment in which the present invention is applied to the portable type TV receiving set, the present invention is not limited to this embodiment and is applicable to various portable type receiving apparatuses.

Figure 13:
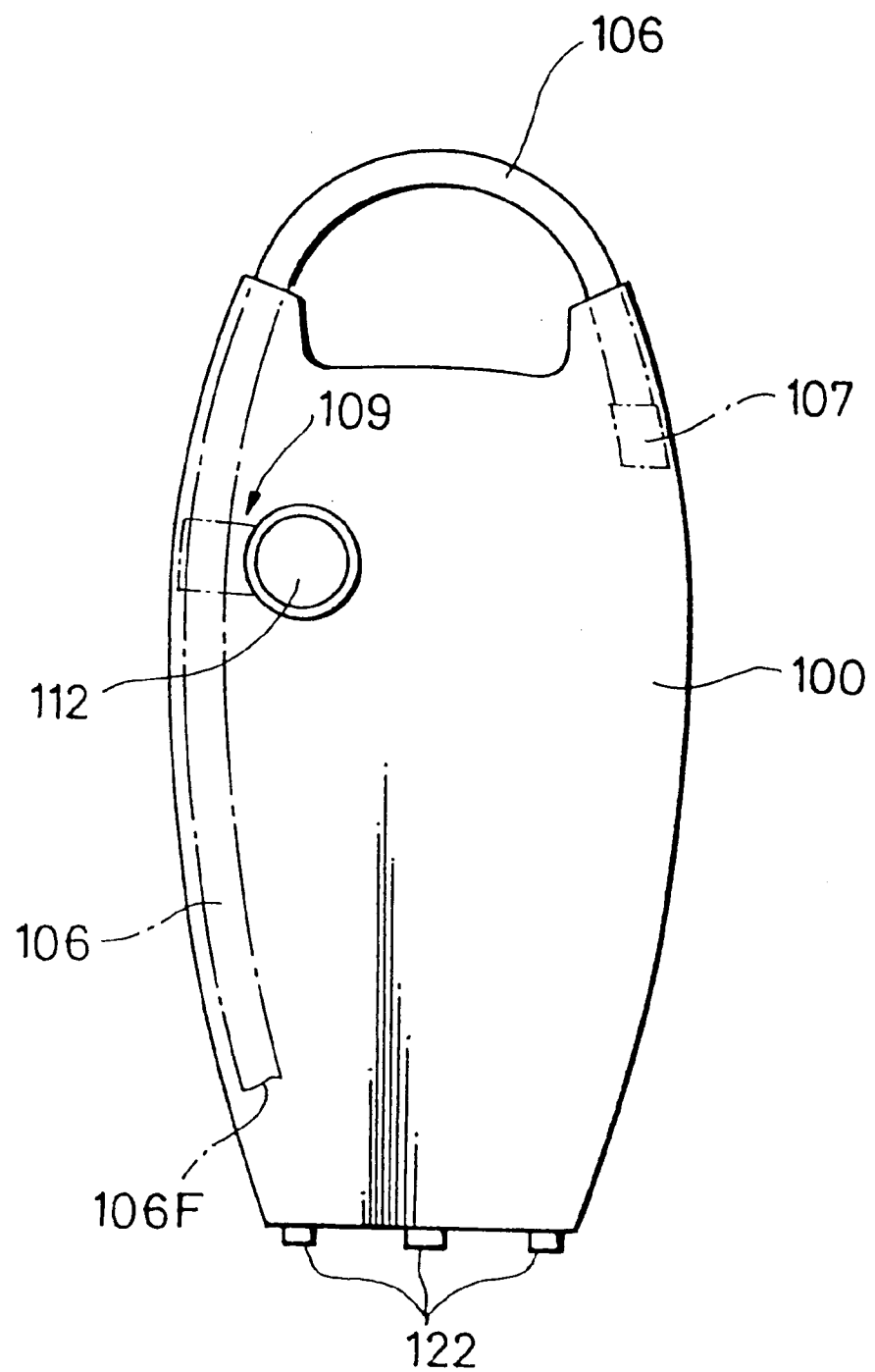
FIG. 13 is a rear view showing an appearance of a portable type TV receiving set as another embodiment of the portable type receiving apparatus according to the present invention.

Next, a schematic structure of a TV receiving set as another embodiment of a portable receiving apparatus according to the present invention is shown in FIG. 13. FIG. 13 corresponds to the rear view of the TV receiving set as an embodiment previously shown in FIG. 2 and further shows a condition of the strap antenna 106 inside the case by chain lines.

This TV receiving set has a portion of the strap antenna 106 exposed outside the set case 100 in the form of a loop via two through holes in the top face. In other words, the loop is formed only at the top of the set case 100 and one end portion of the strap antenna 106 is fastened by the end portion fastening means 107 within the set case 100, the other end portion 106F becoming a free end within the set case 100 via the strap antenna length adjusting means 109. Furthermore, at the bottom of the TV receiving set there is formed neither through hole nor groove for passing therethrough the strap antenna, but projections as a standing bottom part 122 are formed instead.

Since the other structure is the same as that of the aforesaid embodiment, a repeated description will be omitted.

In this case also, similarly to the aforesaid embodiment, there are provided merits in which the loop length of the strap antenna 106 can be adjusted by the strap antenna length adjusting means 109 and besides the self-stand state can be attained by the projections of the standing bottom part 122.

Also, another modification of the strap antenna length adjusting means 109 will be shown next.

Figure 14A:
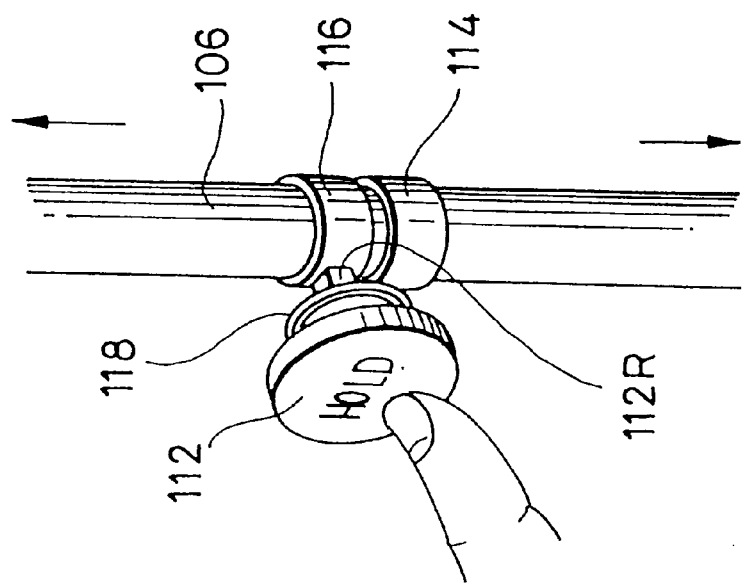
Figure 14B:
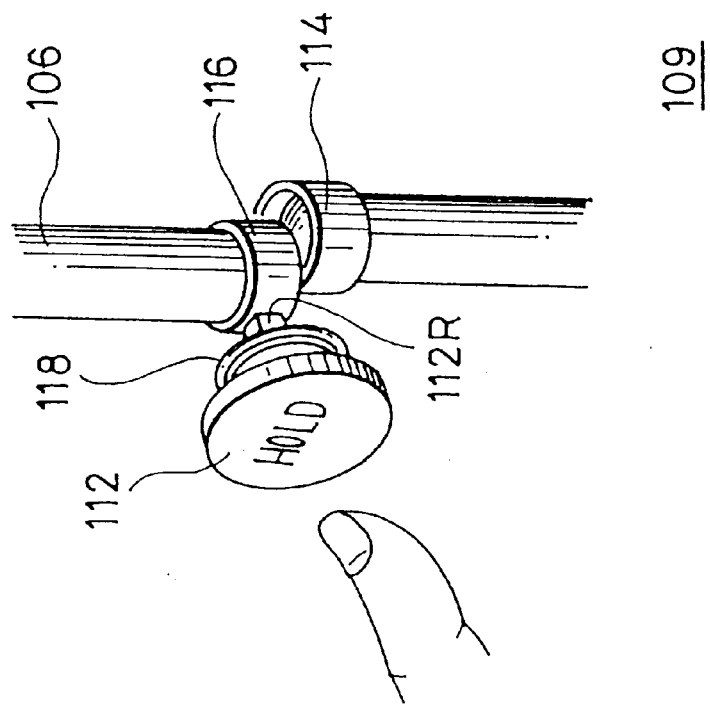
Figure 15A:
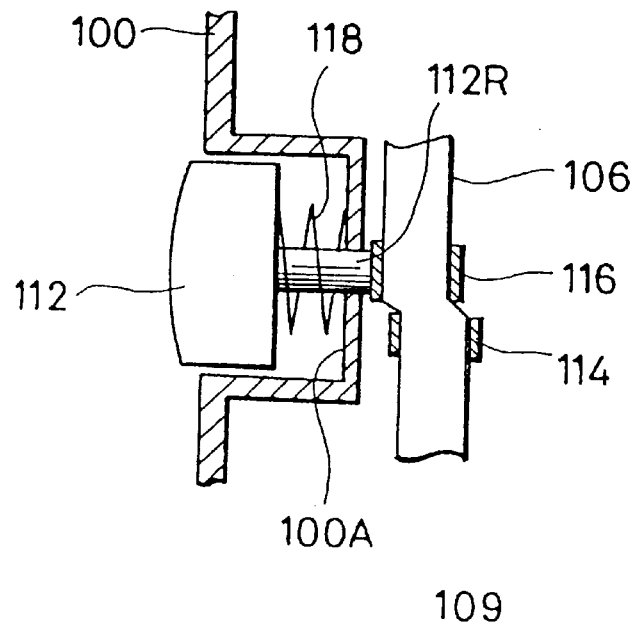
FIGS. 15A and 15B are side sectional diagrams showing the main part of the holding mechanism shown in FIGS. 14A, 14B, and 14C.
Figure 15B:
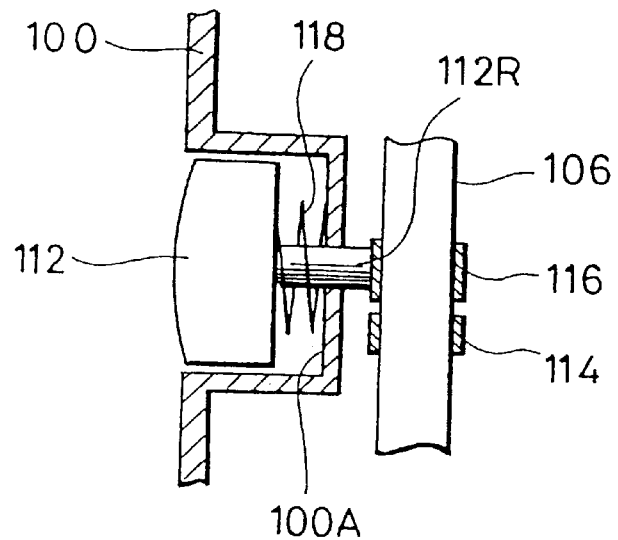
Figure 16A:
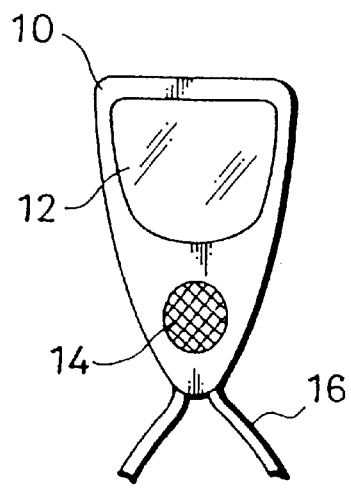
Figure 16B:
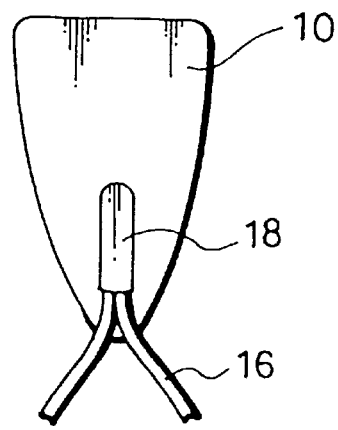

FIGS. 14A and 14B are partially omitted perspective views showing another modification of the structure which is arranged to hold the middle portion of strap antenna 106 for adjusting the loop length. FIGS. 15A and 15B are lateral sectional views showing main parts of FIGS. 14A and 14B.

In this case, a hold button 112 which is similar to the aforesaid embodiment as the pressing means as described below, a connecting rod 112R as a moving means, a stationary ring 114 and a movable ring 116 as the holding means, and a coil spring 118 as the urging means are included.

The stationary ring 114 is fixed e.g. within the inserting part 110.

Further, the movable ring 116 is connected to the hold button 112 through the connecting rod 112R and is arranged so as to be movable relative to the stationary ring 114 to a position displaced in the axis portion of the stationary ring.

A coil spring 118 is fit to the outer periphery of the connecting rod 112R and, as shown in FIG. 15A, intervenes between the hold button 112 and a wall plate 100A of the set case 100 for urging the movable ring 116 in such a direction that its axis deviates from that of the stationary ring 114.

The hold button 112 is operated to press the movable ring 116 in such a direction that its axis coincides with that of the stationary ring 114 against an elastic force of the coil spring 118.

In a condition that the hold button 112 is not operated, as shown in FIG. 14A and FIG. 15A, the axis of movable ring 116 deviates from that of the stationary ring 114 and the strap antenna 106 is caulked to be bent by the elastic force of coil spring 118, thus making its sliding displacement within the inserting part 110 to be held.

By operating the hold button 112 and, as shown in FIG. 14B and FIG. 15B, making the axis of movable ring 116 to coincide with that of the stationary ring 114 against the elastic force of the coil spring 118, the strap antenna 106 is made straight, thereby enabling the sliding displacement thereof within the inserting part 110 to be performed.

Accordingly, the structure of this modification also allows, in the same way as the aforesaid embodiment, the top and bottom loop lengths of the strap antenna 106 to be adjusted in a condition that the hold button 112 is operated to press.

Again, on stopping the operation of hold button 112, the sliding of strap antenna 106 is held. This causes the loop length of strap antenna 106 to be fixed and so the loop of strap antenna 106 can be used as the hanging strap and the like.

In addition, the hold button 112 may be arranged on the side or the front of set case 100 rather than in the rear of the set case 100 as above described each embodiment.

While, in the aforesaid embodiment, the strap antenna length adjusting means 109 comprising the stationary ring 114, etc is formed inside the set case 100 and the hold button 112 is formed outside the set case 100, for example, such a structure is also possible that the stationary ring 114 is fixed outside the set case 100 and the strap antenna length adjusting means 109 is formed outside the set case 100 for causing the strap antenna 106 on this side to pass outside the set case 100.

Further, the portable type receiving apparatus according to the present invention is also applicable to a transmitting and receiving apparatus which performs a transmission and a reception.

However, if the strap antenna is not suitable for a transmitting antenna, it is necessary to further provide a transmitting antenna, etc. specially.

According to the aforesaid portable type receiving apparatus of the present invention, by providing the connecting fastener for fastening both end portions of the strap antenna to the set case or fastening one of the end portions to connect the same to the internal circuit and the holding guide part for slidably holding a middle portion the strap antenna, and then making the strap antenna to slide along the holding guide part, it will be possible to adjust the loop length of the strap antenna in both the top and bottom part or in the top part of the set case.

This makes it possible, for example, to lengthen the loop length of strap antenna in the upward direction of the set case and form this into a hanging strap for hanging the set case somewhere and viewing the display screen. Thus, the set case can be used in the hung state that the display screen is not turned upside down.

Moreover, by adjusting the loop length of strap antenna, it will be possible to adjust it to a length suitable for an individual physique as a neck hanging strap or a shoulder hanging strap. Furthermore, by adjusting the loop length of strap antenna, it will also be possible to adjust the receiving sensitivity.

Therefore, according to the present invention, the strap antenna can be utilized effectively to aim a wide practical use.

The portable type receiving apparatus according to the present invention is not limited to the above described embodiments and other various modifications can be made without departing from the gist of the present invention.

What is claimed is:

1. A portable type receiving apparatus, comprising:
    a case;
    at least one through hole provided in said case;
    a strap antenna having a portion exposed outside said case formed as a loop via said through hole;
    received signal processing means for processing a received signal from said strap antenna;
    connecting means for connecting said strap antenna to said received signal processing means;
    strap antenna length adjusting means for adjusting a length of said exposed portion and including a holding means for slidably holding a middle portion of said strap antenna from a first end portion beyond said exposed portion and for adjusting said length of said exposed portion by sliding said middle portion; and
    an operating button formed in said case for operating said holding means and by an operation of said operating button said middle portion of said strap antenna is slidably held.

2. The portable type receiving apparatus according to claim 1, further comprising:
    end portion fastening means for fastening said first end portion of said strap antenna within the case.

3. The portable type receiving apparatus according to claim 1, wherein two through holes are provided in said case.

4. The portable type receiving apparatus according to claim 1, wherein said through hole is provided in a first end face side of said case, and
    said case has a standing leg part for using said portable type receiving apparatus in a self-stand state in a second end face side opposed to said first end face side.

5. The portable type receiving apparatus according to claim 1, wherein said case has a liquid crystal display and a speaker connected to said received signal processing means, and said portable type receiving apparatus is a television receiving set.

6. The portable type receiving apparatus according to claim 6, wherein said holding means comprises:
    pressing means for pressing said middle portion of said strap antenna to a wall part side of said case;
    urging means for urging said pressing means to said wall part side; and
    moving means for moving said pressing means in a direction that said wall part side resists an urging force from said urging means in response to an operation of said operating button.

7. A portable type receiving apparatus, comprising:
    a case;
    at least one first through hole and at least one second through hole provided in said case;
    a strap antenna having a first portion exposed outside said case formed as a loop via said first through hole and a second portion exposed outside said case formed as a loop via said second through hole;
    received signal processing means for processing a received signal from said strap antenna;
    connecting means for connecting said strap antenna to said received signal processing means;
    strap antenna length adjusting means for adjusting each respective length of said first portion and said second portion and including a holding means for slidably holding a middle portion of said strap antenna within said case and for adjusting each respective length of said first exposed portion and said second exposed portion by sliding said middle portion; and
    an operating button formed in said case for operating said holding means and by an operation of said operating button said middle portion of said strap antenna is slidably held.

8. The portable type receiving apparatus according to claim 7, wherein said holding means includes pressing means for pressing said middle portion of said strap antenna to a wall part side of said case and moving means for moving said pressing means in a direction that said wall part side resists an urging force from said urging means in response to an operation of said operating button.

9. The portable type receiving apparatus according to claim 7, wherein said case has a liquid crystal display and a speaker connected to said received signal processing means and said portable type receiving apparatus is a television receiving set.

10. The portable type receiving apparatus according to claim 7, further comprising:
    first end portion fastening means for fastening a first end portion of said strap antenna within said case; and
    second end portion fastening means for fastening a second end portion of said strap antenna within said case.

11. The portable type receiving apparatus according to claim 10, wherein two first through holes and two second through holes are provided in said case.

12. The portable type receiving apparatus according to claim 7, wherein said first through hole is provided in a first end face side of said case and said second through hole is provided in a second end face said of said case opposed to said first end face side.

13. The portable type receiving apparatus according to claim 12, wherein said case has a standing leg part for using said portable type receiving apparatus in a self-stand state, said standing leg part being formed in one of said first end face side and said second end face side.

14. The portable type receiving apparatus according to claim 13, wherein said case has a strap antenna escaping part for making said first portion or said second portion of said strap antenna exposed in the form of a loop outside said case, said strap antenna escaping part being formed in one of said first end face side and said second end face side.

* * * * *